Figure 1:
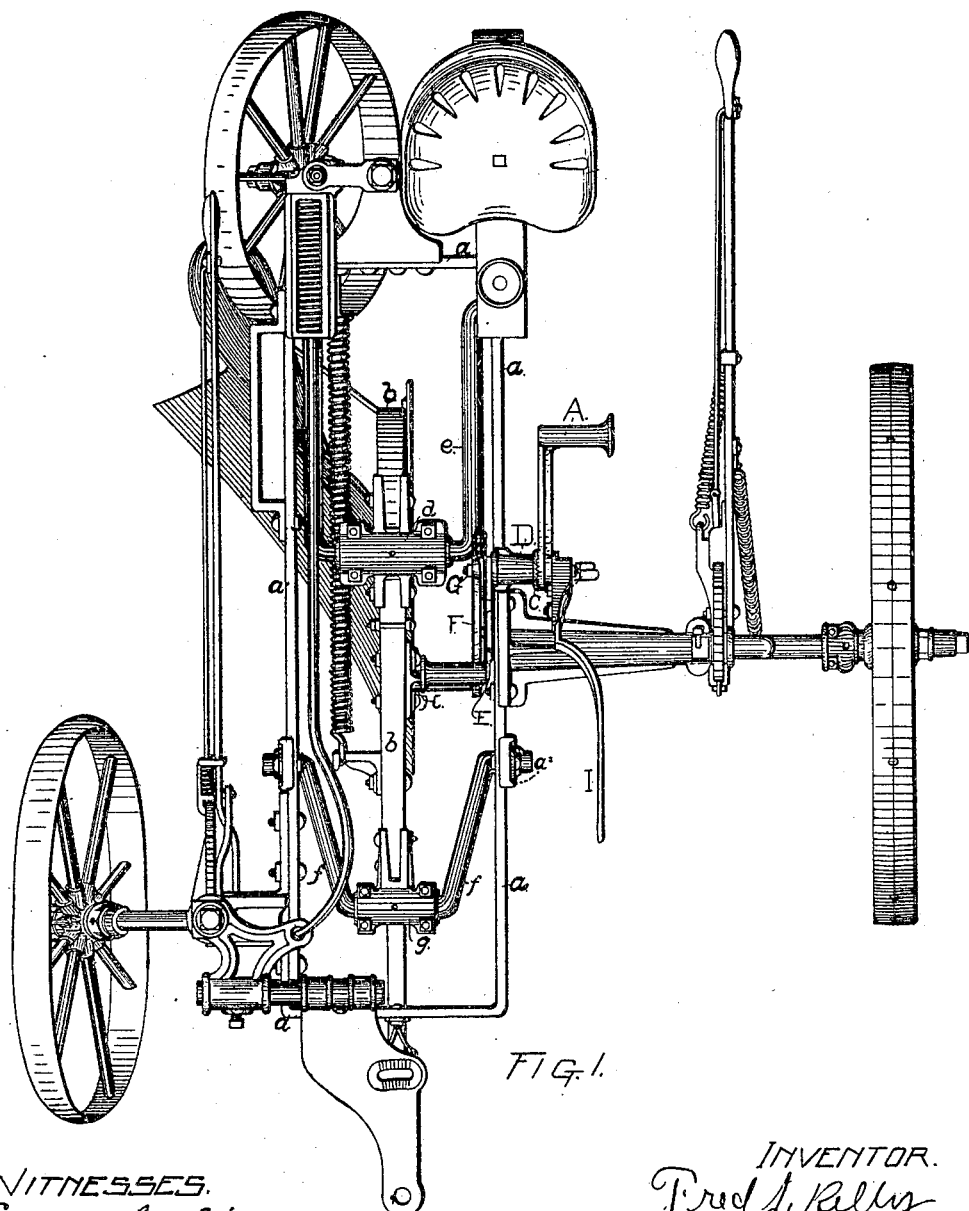

No. 812,273. PATENTED FEB. 13, 1906.
F. J. KELLY.
LIFTING DEVICE FOR GANG AND SULKY PLOWS.
APPLICATION FILED MAY 17, 1904.

3 SHEETS—SHEET 1.

WITNESSES.
INVENTOR.
Fred J. Kelly
per Clark C. Mount
ATTORNEY.

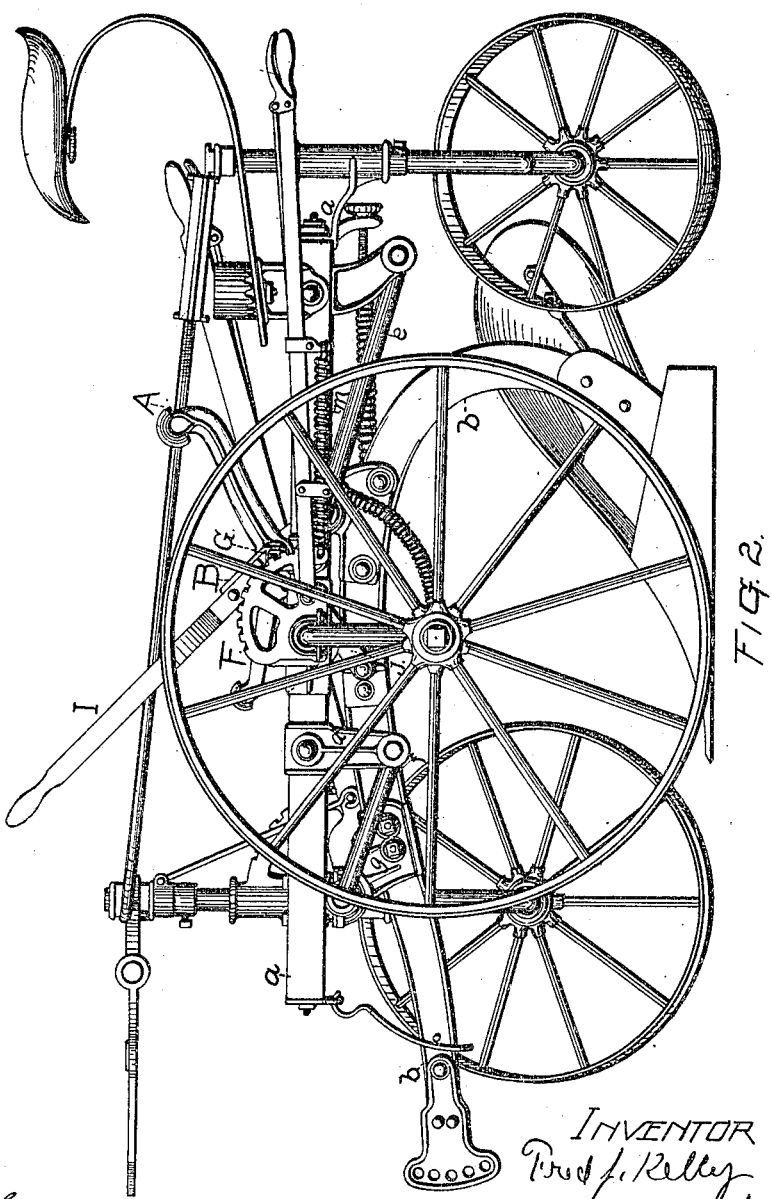

No. 812,273. PATENTED FEB. 13, 1906.
F. J. KELLY.
LIFTING DEVICE FOR GANG AND SULKY PLOWS.
APPLICATION FILED MAY 17, 1904.
3 SHEETS—SHEET 3.
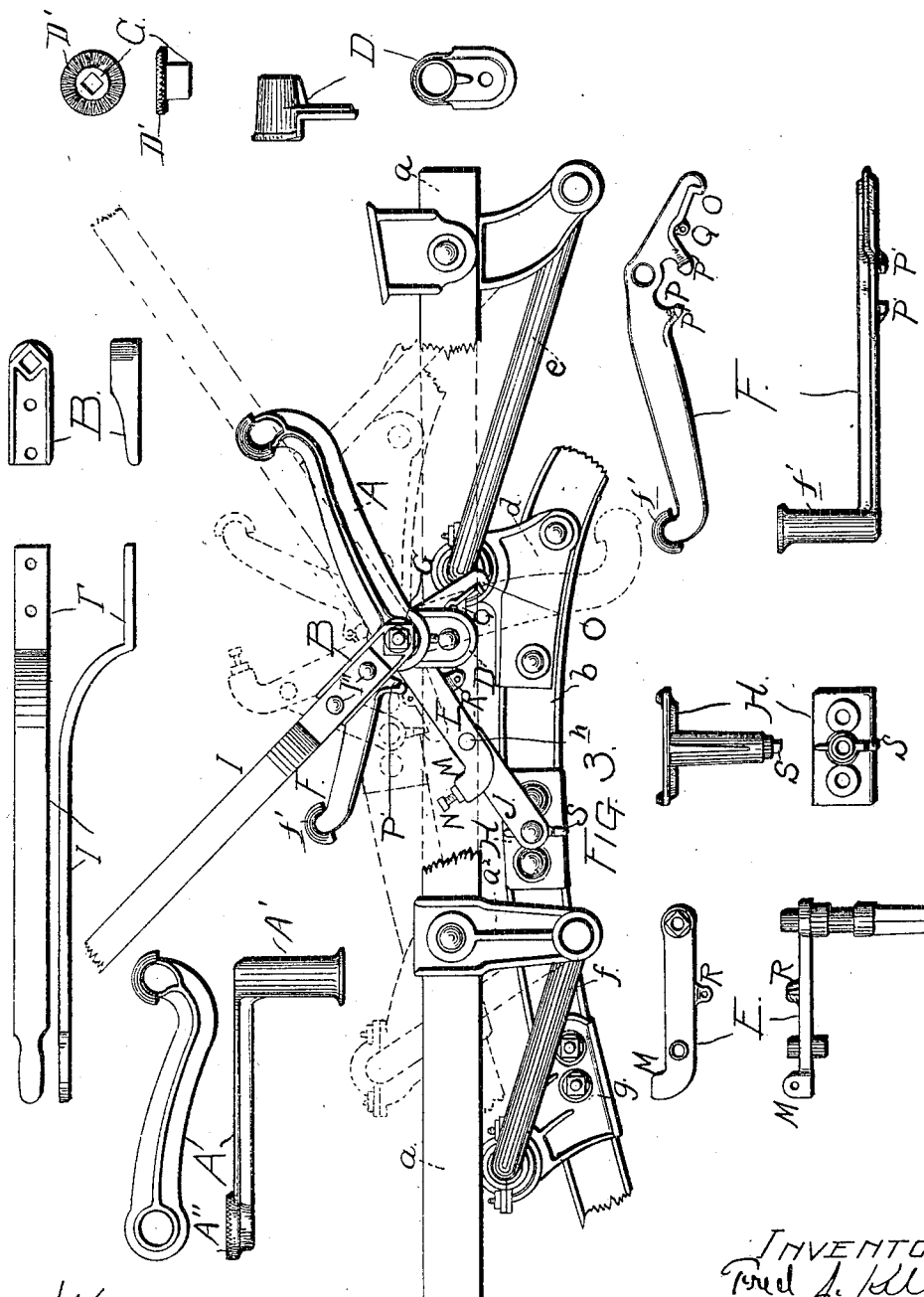
WITNESSES.
Edward Cahill
Florence A. Johnson
INVENTOR.
Fred J. Kelly
PER. Clark C. Wood
ATTORNEY.

UNITED STATES PATENT OFFICE.

FRED J. KELLY, OF LANSING, MICHIGAN, ASSIGNOR TO E. BEMENT'S SONS, OF LANSING, MICHIGAN, A CORPORATION OF MICHIGAN.

LIFTING DEVICE FOR GANG AND SULKY PLOWS.

No. 812,273.     Specification of Letters Patent.     Patented Feb. 13, 1906.

Application filed May 17, 1904. Serial No. 208,480.

*To all whom it may concern:*

Be it known that I, FRED J. KELLY, a citizen of the United States, residing and having my post-office address at Lansing, in the county of Ingham and State of Michigan, have invented new and useful Improvements in Lifting Devices for Gang and Sulky Plows, of which the following is a specification.

My invention relates to gang and sulky plows, and especially to the means employed for raising and lowering said plows; and the object of my invention is to make a device for raising and lowering such plows that shall be easier and more efficient in operation than the ordinary device, that shall when desired be capable of operation by either a foot or hand lever, or both combined, and that shall be more economical in construction.

In the drawings, Figure 1 represents a plan view of a sulky-plow fitted with my device. Fig. 2 is a side elevation of the same plow, showing the plow in position for work. Fig. 3 shows the working parts of the lifting device as they appear in operation, the solid lines showing the device as it is when the plow is lowered for work and the dotted lines the corresponding position when the plow is raised. The remaining figures of Fig. 3 represent detailed views of different parts.

Referring to the drawings, $b$ is the beam of a sulky or gang plow, which is constructed in the usual manner.

$a$ represents a frame, from which the plow-beam $b$ is suspended by pivotally-connected bails $e$ and $f$, secured, respectively, to the plates $d$ and $g$ on said beam. A bearing D is mounted on the frame $a$, and a shaft G revolves in this bearing. Rigidly attached to the shaft G at its inner end is one arm, E, of a toggle, the other arm, J, of which is pivotally connected to a plate H on the plow-beam $b$, as shown in Fig. 3. The pivotal connection $h$ of the arm E is, as shown in the drawings, at a short distance from the lower end, which is turned upward and inward to form a projection M, in which is formed an opening for a set-screw N. When this set-screw is screwed down, it prevents the toggle from becoming absolutely straight, and therefore from locking in its position. It also serves to regulate the depth to which the plow is permitted to descend. Pivoted to the axle or shaft G, to which the arm E is connected at its inner end, is a foot-lever F. (Shown in detail in Fig. 3.) At one end of this lever is a stop or foot piece $f''$ and at the other is a hook O, the purpose of which will be more fully explained hereinafter. A notch P is formed near the axis of the lever F, the outer ends P' of which are turned inward, so as to embrace somewhat loosely the arm E. A spiral spring R', connected at one end to the eyelet Q and at the other to the eyelet R, serves to keep the lower of the two projections P' pressed continuously against the arm E. On the lower side of the plate H on the beam $b$ is formed a lug S, adapted to engage with the hook O when the plow-beam $b$ is raised at its highest position and to retain it there until the hook is released by pressing on the foot-lever F.

A hand-lever I, having the offset portion I', is secured to a bearing B by bolts I'', the said bearing B being in turn secured in any convenient manner to the outer end of the shaft G in the bearing D, and a foot-lever A, having at one end the foot-rest A' and at its opposite end a serrated bearing-face A'', is adapted to engage a serrated face D' of said shaft G, thereby forming an adjustable connection between the foot-lever and shaft.

The operation of the device is as follows: Suppose the plow to be at its highest point and the different working parts as shown by the entire lines in Fig. 3. If the foot-lever A is pressed downward or the hand-lever I pulled toward the rear, it will cause the shaft G, to which the arm E is attached, to revolve, carrying with it the arm E, and therefore, by means of the link J, raising the plow-beam. At the same time the pressure of the arm E against the upper one of the two projections P' will raise the foot-lever F and cause it to revolve around the shaft until the hook O engages with the lug S and, as already stated, prevent the toggle from straightening, and therefore retain the plow-beam in its elevated position until the clutch O is released from the lugs S by pressing against the foot-lever F, the distance between the projections P' being sufficient to permit of this release. When the plow-beam is at its highest point, the different parts will occupy the positions shown in the dotted lines. It is evident that the same result exactly is obtained by pressing on the foot-lever A as by drawing the hand-lever I and that either, or both, may be used at pleasure. It is also evident that when the plow is at its highest position it will be securely locked there until released by pressing the foot-lever F.

I claim—

1. In combination, a plow-frame, a plow with means for suspending the same from the frame, means for raising said plow, an automatically-operable hook pivoted in said lifting means and a stationary lug adapted to be engaged by said hook on the beam of the plow, substantially as described.

2. In combination a plow-frame, a plow with means for suspending the same from the frame, means for raising said plow including a shaft, a lever thereon, a bail between said shaft and plow-beam, a hook pivoted to the shaft and operatively connected to said bail, and a lug adapted to be engaged by said hook attached to the beam of said plow.

3. In combination with a plow and frame from which said plow is adjustably suspended, a lever for raising said plow, a bail connecting said lever with the beam of said plow, a hook pivoted on the shaft of said lever and loosely connected to said bail, and a lug adapted to be engaged by said hook, substantially as described.

4. In combination with a plow and frame from which said plow is adjustably suspended, a lever for raising said plow, mounted on said frame, a bail connecting said lever with the beams of said plow, a hook pivoted on the shaft of said lever means on the hook for engaging said bail and a lug adapted to be engaged by said hook, substantially as described.

5. In combination with a plow and frame from which said plow is adjustably suspended, a lever for raising said plow, a bail connecting said lever with the beam of said plow, a hook pivoted on the shaft of said lever, a lug adapted to be engaged by said hook, and a foot-lever connected to said hook for releasing said clutch, substantially as described.

6. In combination, a plow-beam, a frame from which the latter is adjustably suspended, a lever for raising said plow, a bail operatively connected with said lever and beam, a hook loosely connected to said bail, and a lug on the beam adapted to be engaged by said hook upon the operation of said lever.

7. In combination, a plow-beam, a frame from which the latter is adjustably suspended, a plate on the beam having an outwardly-extended lug thereon, a shaft, a bail connected respectively to said shaft and plate, a lever operatively associated with said bail, and a hook operable upon the movement of said lever and bail adapted to engage said lug.

8. In combination a plow-beam, a frame from which said beam is suspended, a shaft on the frame having a serrated bearing-face, a bail operatively connected adjacent its respective ends to said shaft and beam, a lever for adjusting the beam, having a serrated bearing-face adapted to engage the complementary face of the shaft whereby the adjustable connection is formed, and means for retaining the beam in adjustable positions.

9. In combination, a plow-beam and a frame from which the plow-beam is suspended, a lever for raising said plow, a shaft to which said lever is pivoted, a bail connected respectively to the shaft and plow-beam, a second lever operatively connected intermediate its ends to said bail, and having at its lower end a hook, and a lug on the beam adapted to be engaged by said hook.

In testimony whereof I have signed my name to this specification in the presence of two subscribing witnesses.

FRED J. KELLY.

Witnesses:
HARRIET L. LAWRENCE,
FLORENCE A. JOHNSON.